(12) United States Patent
Ogawa et al.

(10) Patent No.: US 7,369,479 B2
(45) Date of Patent: May 6, 2008

(54) OPTICAL MINIATURIZED MODULE, OPTICAL PICKUP DEVICE, AND OPTICAL DISK DEVICE PROVIDED WITH LIGHT SOURCE AND PHOTODETECTOR

(75) Inventors: Masaru Ogawa, Ikoma (JP); Tetsuo Ueyama, Nara (JP); Kohji Minami, Gose (JP); Tomoyuki Miyake, Nara (JP); Tomiyuki Numata, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 685 days.

(21) Appl. No.: 11/029,599

(22) Filed: Jan. 4, 2005

(65) Prior Publication Data

US 2005/0152636 A1 Jul. 14, 2005

(30) Foreign Application Priority Data

Jan. 8, 2004 (JP) ............................. 2004-003236

(51) Int. Cl.
*G11B 7/00* (2006.01)
(52) U.S. Cl. ........................... 369/112.04; 369/112.05; 369/112.16
(58) Field of Classification Search ............ 369/112.04
See application file for complete search history.

(56) References Cited

U.S. PATENT DOCUMENTS 5,428,595 A * 6/1995 Yoshida et al. ........ 369/112.04
6,167,017 A * 12/2000 Higashiura et al. ...... 369/44.23
2002/0163874 A1* 11/2002 Nakanishi et al. ..... 369/112.04
2004/0001419 A1* 1/2004 Ariyoshi et al. ....... 369/112.04

FOREIGN PATENT DOCUMENTS

| JP | 5-20711 | 1/1993 |
| JP | 2001-014717 | 1/2001 |
| JP | 2001-273666 | 10/2001 |
| JP | 2002-237080 | 8/2002 |
| WO | WO-02/097805 A1 | 12/2002 |
| WO | WO-03/041066 A1 | 5/2003 |

\* cited by examiner

*Primary Examiner*—Paul W. Huber
(74) *Attorney, Agent, or Firm*—David G. Conlin; David A. Tucker; Edwards Angell Palmer & Dodge LLP

(57) ABSTRACT

The optical miniaturized module includes a semiconductor laser for irradiating an optical disk with laser light, a diffraction grating for forming a main beam and two sub beams from the laser light, a polarization hologram for dividing reflected light from the optical disk, and a photodetector for detecting the reflected light. The polarization hologram includes a first parting line defined in a direction optically corresponding to a radial direction as the optical disk rotates. A main beam M incident area is divided with a boundary defined by the first parting line. A sub beam A incident area and a sub beam B incident area are each arranged avoiding the first parting line.

11 Claims, 5 Drawing Sheets

FIG.1A
FIG.1B
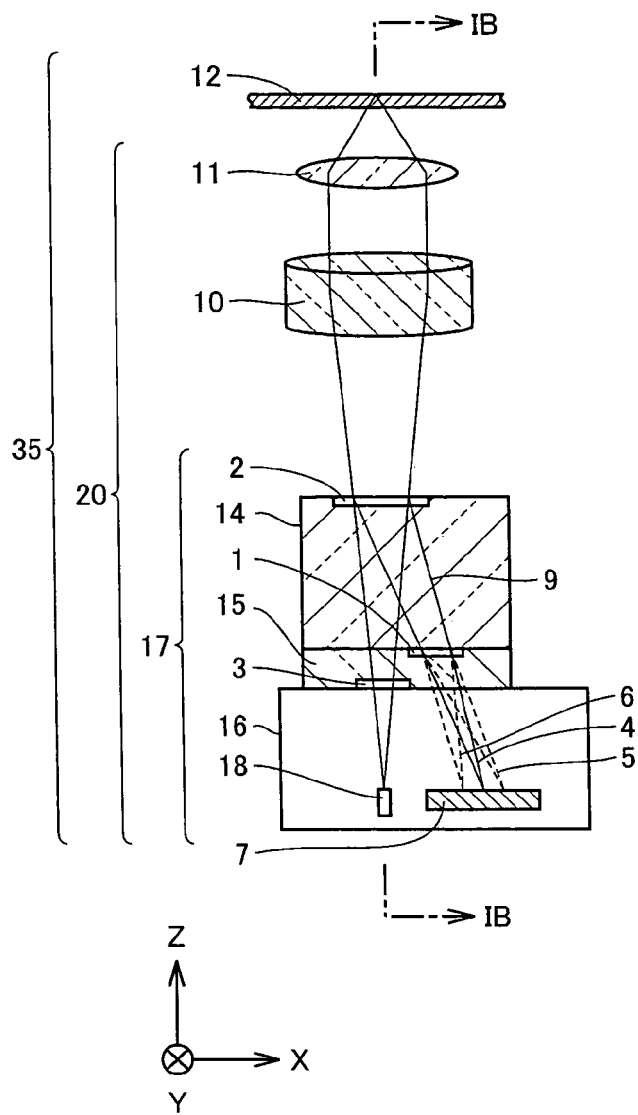
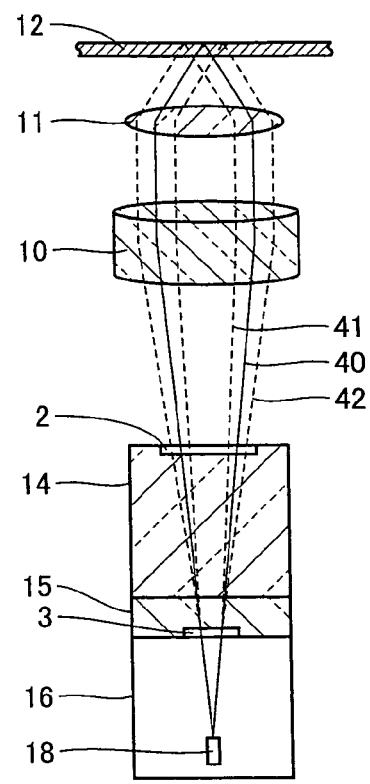
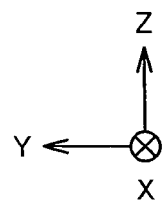

OPTICAL MINIATURIZED MODULE, OPTICAL PICKUP DEVICE, AND OPTICAL DISK DEVICE PROVIDED WITH LIGHT SOURCE AND PHOTODETECTOR

This nonprovisional application is based on Japanese Patent Application No. 2004-003236 filed with the Japan Patent Office on Jan. 8, 2004, the entire contents of which are hereby incorporated by reference.

BACKGROUND OF THE INVENTION

1. Field of the Invention

The present invention relates to an optical miniaturized module, optical pickup device and optical disk device, for use in recording information on and reproducing information from an optical storage medium such as an optical disk.

2. Description of the Background Art

Conventionally, the three-beam method and the push-pull method are primarily known as the tracking servo methods for optical disk devices. When such methods are employed for an optical disk device, there occurs an offset upon recording, reproduction or access. The offset may also occur when the optical disk is tilted. As a way of compensating such an offset, a differential push-pull (DPP) method has been proposed. In recent years, the DPP method has been employed for an optical disk device such as a digital versatile disk (DVD) player that records information in high density.

In the DPP method, push-pull signals are detected from reflected lights of a main beam that is the primary light (hereinafter, referred to as "main beam M") and of two sub beams formed to follow main beam M (hereinafter, referred to as "sub beam A" and "sub beam B"). The detected values are subject to operation to generate a tracking error signal in the DPP method. Sub beams A and B are arranged before and after main beam M (for example, sub beam A is a preceding beam and sub beam B is a succeeding beam with respect to main beam M) in a direction along the track on the surface of the optical storage medium. Further, the push-pull signal obtained from main beam M has a phase inverted from those of the push-pull signals obtained from sub beams A and B. With the DPP method, the push-pull signal obtained from main beam M and the push-pull signals obtained from sub beams A and B are subject to operation to effect control to remove the offset of the tracking error signal.

An optical storage medium of a phase change method, used for a DVD player or the like, has a recorded portion and an unrecorded portion that differ in reflectance of light from each other. Thus, for example when preceding sub beam A moves from the recorded portion to the unrecorded portion, there occurs a state where the unrecorded portion is irradiated with the preceding sub beam A while the recorded portion is irradiated with the succeeding sub beam B. In such a state, only the detected signal of sub beam A experiences a change by an amount corresponding to the change of the reflectance. Using the detected signals of both the preceding and succeeding beams for the operation can reduce the deficiency in removal of the offset of the tracking error signal by the changed amount of the reflectance. Accordingly, when the DPP method is applied to the phase-change type optical storage medium, it is necessary to carry out an operation by detecting the signals of both sub beams A and B arranged before and after main beam M on the surface of the optical storage medium.

The applicant has proposed in Japanese Patent Laying-Open No. 2001-273666 an optical pickup device provided with an optical miniaturized module that can employ the DPP method. FIGS. 5A and 5B show the optical miniaturized module disclosed therein. FIG. 5A is a schematic cross sectional view of the optical miniaturized module. The optical miniaturized module includes a semiconductor laser 105 as a source of light, a three-beam diffraction grating 106 for dividing the light, a composite prism 107 for separating the laser light emitted from the light source and its reflected light from each other, a hologram element 109 for dividing the reflected light, and a photodetector 110.

Lased light 119 from semiconductor laser 105 is divided by three-beam diffraction grating 106 into main beam M and two sub beams A and B. These three beams pass through a polarization beam splitter (PBS) surface 107a formed at composite prism 107, and are directed via a ¼ wave plate 108 to a collimate lens (not shown). In FIG. 5A, sub beams A and B are not shown for the sake of simplicity of the drawing. Reflected light 120 from an optical storage medium in the form of an optical disk passes through ¼ wave plate 108, is reflected at PBS surface 107a and a reflective mirror surface 107b, and is incident on hologram element 109, where it is diffracted to enter photodetector 110.

The light emitted from semiconductor laser 105 passes through PBS surface 107a in the state of linearly polarized light in the X direction (P polarization) shown in FIG. 5A. It is then transformed into a circularly polarized light at ¼ wave plate 108, to irradiate the optical disk. The reflected light from the optical disk reenters ¼ wave plate 108, where it becomes a polarized light in the Y direction (S polarization) and is reflected at PBS surface 107a. As such, lased light 119 and reflected light 120 are separated from each other at PBS surface 107a.

FIG. 5B illustrates the optical miniaturized module as seen through from above. Three-beam diffraction grating 106 is arranged approximately at the center of the optical miniaturized module, and hologram element 109 is arranged to its side. Composite prism 107 is formed to cover three-beam diffraction grating 106 and hologram element 109.

FIG. 6 is a plan view showing the positional relation of the hologram element and the laser light incident on the hologram element based on a conventional technique. Hologram element 109 includes a first parting line 51 that is defined in the X direction optically corresponding to the radial direction as the optical disk rotates, and a second parting line 52 that is defined in the Y direction optically corresponding to the track direction. First and second parting lines 51 and 52 partition hologram element 109 into three areas of d area 64, e area 65 and f area 66. With hologram element 109 being in a circular shape in a plane, first parting line 51 is defined to correspond to the diameter of the circle at the perimeter of hologram element 109, and second parting line 52 is defined to correspond to the radius of the circle of hologram element 109 and to be perpendicular to first parting line 51.

Main beam M is incident on a main beam M incident area 45. Main beam M incident area 45 is arranged in an approximately circular shape in a plane, coaxial with the circle at the perimeter of hologram element 109. Sub beam A is incident on a sub beam A incident area 46, which is arranged offset from main beam M incident area 45 in the Y direction. Sub beam B is incident on a sub beam B incident area 47, which is also arranged offset from main beam M incident area 45 in the Y direction. Sub beam A incident area 46 and sub beam B incident area 47 each intersect first and second parting lines 51 and 52. That is, each of these sub beam incident areas is arranged to include respective parts of the three partitioned areas of hologram element 109.

FIG. 7 schematically illustrates photodetector 110 for detecting reflected lights and an operation unit 190 for performing operations on signals obtained from the photodetector. Photodetector 110 receives reflected lights in three rows. They include a 0th-order diffracted light incident on the row indicated by an arrow 204, a +1st-order diffracted light incident on the row indicated by an arrow 205, and a −1st-order diffracted light incident on the row indicated by an arrow 206. Photodetector 110 includes light receiving portions 121-126 for receiving the light diffracted in the +1st-order direction by the hologram element, and light receiving portions 127-129 for receiving the light diffracted in the −1st-order direction. Here, signals output from light receiving portions 121-129 are represented as S121-S129, respectively. Although the 0th-order diffracted light is not shown in FIG. 5A, it occurs in a small amount. Thus, in FIG. 7, portions on which the 0th-order diffracted light impinges are shown in the row indicated by arrow 204.

In FIG. 7, a reference character has been allotted to each portion on which laser light impinges in the following manner. The first letter of the reference character indicates whether it is a transmitted light or a diffracted light. Specifically, "5" represents the +1st-order diffracted light, "6" represents the −1st-order diffracted light, and "4" represents the 0th-order diffracted light (transmitted light). The second letter indicates whether it is main beam M or sub beam A or B. "M" represents main beam M, and "A" and "B" represent sub beams A and B, respectively. The third letter indicates where in the polarization hologram the light was divided. "d" represents the light diffracted in the d area. "e" represents the light diffracted in the e area, and "f" represents the light diffracted in the f area. For example, of the impinging portions of the laser light, the one denoted by "5Md" indicates the +1st-order diffracted light of main beam M, which was diffracted in the d area of the polarization hologram. The 0th-order diffracted light is denoted by only the first two letters, such as "4M".

In FIG. 7, of the reflected light of main beam M, the +1 st-order diffracted light diffracted in d area 64 of the hologram element (see FIG. 6) is detected at a gap portion between the neighboring light receiving portions 123 and 124. The −1st-order diffracted light is detected at light receiving portion 128. Further, of the reflected light of main beam M, the −1st-order diffracted light from the e area of the hologram element is received at light receiving portion 129, and the −1st-order diffracted light from the f area is detected at light receiving portion 127.

As to sub beam A, the +1st-order diffracted light diffracted in the e area is detected at light receiving portion 122, and the +1st-order diffracted light diffracted in the f area is detected at light receiving portion 126. As to sub beam B, the +1st-order diffracted light diffracted in the e area is detected at light receiving portion 121, and the +1st-order diffracted light diffracted in the f area is detected at light receiving portion 125. The signals detected by photodetector 110 for the lights divided by the hologram element are processed in the following manner.

A focus error signal (FES) is calculated by the following expression (1).

$$FES = S123 - S124 \tag{1}$$

A tracking error signal (TES4) may be obtained from the following expression (2), based on the push-pull method using S129 and S127. However, from the above-described reasons, an operation method based on the DPP method is primarily employed, where push-pull signals TES4, TES(A) and TES(B) are obtained from main beam M and sub beams A and B, respectively, and then, TES5 is calculated as shown by the following expression (3).

$$TES4 = S129 - S127 \tag{2}$$

$$\begin{aligned} TES(A) &= (S122 - S126) \\ TES(B) &= (S121 - S125) \\ TES5 &= TES4 - k(TES(A) + TES(B)) \\ &= (S129 - S127) - k\{(S122 - S126) + (S121 - S125)\} \end{aligned} \tag{3}$$

In the above expression (3), a constant k is for compensation of a difference in intensity of the main and sub beams. For example, in the case where the relative ratio in light intensity of the reflected lights of main beam M and sub beams A and B for calculation of TES5 is a:b:c, then k is obtained by k=a/(2b). Further, at the time of reproduction of an optical disk recorded with bit information, a phase contrast of S129 and S127 may be detected to thereby obtain TES6 by a differential phase detection (DPD) method, as in the following expression, which is indicated for reference.

$$TES6 = S129 - S127$$

A recorded information signal (RF) is obtained by the following expression (4).

$$RF = S127 + S128 + S129 \tag{4}$$

Operation unit 190 in FIG. 7 schematically shows circuits for performing the operations indicated by the expression (3) above. A subtracter 194 calculates TES4, and subtracters 191 and 192 calculates TES(A) and TES(B), respectively. An adder 193 calculates TES(A)+TES(B), which is multiplied by constant k by an amplifier 195. A subtracter 196 calculates TES5 by the DPP method.

As described above, in order to apply the DPP method to an optical pickup device for the phase-change type optical storage medium, it is necessary to detect two sub beams formed before and after main beam M in the track direction of the optical storage medium. Further, in an optical miniaturized module based on the conventional technique using the DPP method, as shown in FIG. 7, four light receiving portions in total are required for detecting the reflected lights of two sub beams A and B, i.e., light receiving portions 122, 126 for detection of sub beam A and light receiving portions 121, 125 for detection of sub beam B. This increases an area occupied by the photodetector, hindering downsizing of the optical miniaturized module. The increase in number of photodetectors increases the cost as well.

Further, since calculation of signals TES(A) and TES (B) involves four light receiving portions 121, 122, 125 and 126, the number of calculators increases, resulting in complicated circuit configuration.

SUMMARY OF THE INVENTION

An object of the present invention is to provide an optical miniaturized module, optical pickup device and optical disk device that are reduced in size and simplified in circuit configuration of an operation unit.

An optical miniaturized module according to the present invention includes: a light source for irradiating an optical storage medium with light; a sub beam formation element for forming a main beam and at least one sub beam from the light; a reflected light division element for dividing reflected light from the optical storage medium; and a photodetector for detecting the reflected light. The reflected light division element includes a first parting line defined in a direction optically corresponding to a radial direction as the optical storage medium rotates. The reflected light of the main beam is divided with a boundary defined by the first parting line. The reflected light of the sub beam reaches a position avoiding the first parting line. With this configuration, it is possible to provide an optical miniaturized module reduced in size and simplified in circuit configuration of an operation unit. Further, it is possible to provide an optical miniaturized module exhibiting stable tracking servo performance.

Preferably, in the above invention, the reflected light division element and the photodetector are arranged at a distance from each other with which the reflected light of the sub beam reaches the position avoiding the first parting line. With this configuration, the reflected light of the sub beam can easily reach the position off the first parting line.

Preferably, in the above invention, the reflected light division element includes a second parting line defined in a direction perpendicular to the direction optically corresponding to the radial direction, and the reflected light of the main beam and at least a part of the reflected light of the sub beam are each divided with a boundary defined by the second parting line. With this configuration, it is possible to divide the lights so as to form tracking error signals.

Preferably, in the above invention, the sub beam formation element includes a blazed grating. With this configuration, the signal output for compensating the offset due to the shift of the objective lens can be enhanced to thereby ensure stable tracking servo.

Preferably, in the above invention, the optical miniaturized module includes an optical path separation element arranged between the sub beam formation element and the optical storage medium and having a function to transmit the light from the light source directed to the optical storage medium and a function to guide at least a part of the reflected light toward the reflected light division element. With this configuration, the range for arrangement of the reflected light division element and the photodetector increases, leading to an increased degree of design freedom. Further, the optical path separation element can be provided with the function of multiplying the Kerr rotation angle, which leads to improvement of the detecting function of a magneto-optic signal.

Preferably, in the above invention, the optical path separation element includes a polarization diffraction grating. With this configuration, the optical path separation element itself can be made thinner, which leads to further reduction in size and thickness of the optical miniaturized module.

Preferably, in the above invention, the optical path separation element is formed with a first surface where a first optical medium and a second optical medium come into contact with each other. With this configuration, the optical path separation element can readily be formed with a polarization beam splitter having well-known materials adhered to each other.

Preferably, in the above invention, the optical miniaturized module includes a second surface where the first optical medium and the second optical medium come into contact with each other. The second surface is arranged on a path of the light, between the optical path separation element and the reflected light division element, and parallel to the first surface. With this configuration, the reflected light can be incident orthogonally on the reflected light division element, facilitating design of the reflected light division element. Further, the reflected light does not suffer deformation at the reflected light division element, which simplifies processing including division of the reflected light.

An optical pickup device according to the present invention includes: the above-described optical miniaturized module; and an objective lens for focusing the light emitted from the light source onto the optical storage medium. With this configuration, it is possible to provide an optical pickup device reduced in size and simplified in circuit configuration of an operation unit. Further, it is possible to provide an optical pickup device ensuring stable tracking servo.

Preferably, in the above invention, the reflected light division element includes a second parting line defined in a direction perpendicular to the direction optically corresponding to the radial direction. The optical pickup device includes: an operation unit for forming a first tracking error signal by performing an operation on detected signals of two divided lights formed when the reflected light of the main beam is divided with a boundary defined by the second parting line; an operation unit for forming a second tracking error signal by performing an operation on detected signals of two divided lights formed when the reflected light of the sub beam is divided with a boundary defined by the second parting line; and an operation unit for forming a third tracking error signal by performing an operation using the first tracking error signal and the second tracking error signal. With this configuration, it is possible to perform operations on the obtained signals, to thereby reduce the influence of the offset due to the shift of the objective lens. As such, an optical pickup device ensuring stable servo can be provided.

An optical disk device according to the present invention includes: the above-described optical pickup device; and an optical storage medium of magneto-optic recording method. With this configuration, it is possible to provide an optical disk device reduced in size and simplified in circuit configuration of an operation unit. Further, it is possible to provide an optical disk device ensuring stable recording and reproduction by the magneto-optic recording method.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 1A and 1B are schematic cross sectional views of an optical disk device according to a first embodiment of the present invention.

FIG. 6 illustrates light incident on a polarization hologram in the optical miniaturized module based on the conventional technique.

DESCRIPTION OF THE PREFERRED EMBODIMENTS

First Embodiment

Figure 2:
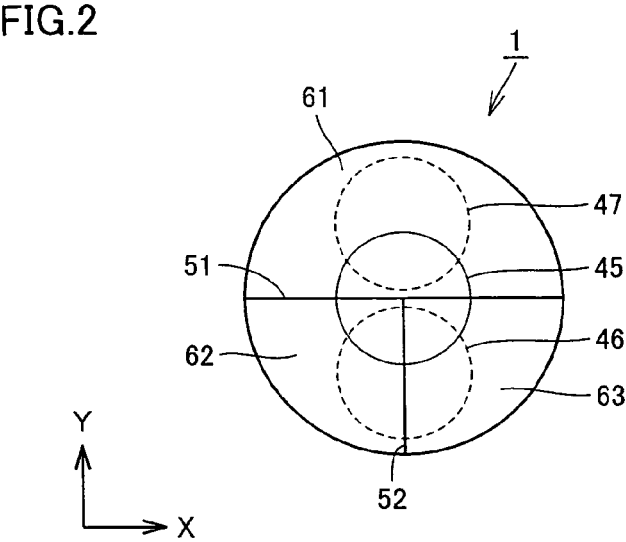
FIG. 2 illustrates light incident on a polarization hologram in the first embodiment.

Referring to FIGS. 1A through 3, an optical miniaturized module, optical pickup device and optical disk device according to a first embodiment of the present invention are described. FIG. 1A is a cross sectional view of an optical disk device according to the present embodiment. FIG. 1B is a cross sectional view taken in a direction of an arrow along the line IB-IB in FIG. 1A. In FIGS. 1A and 1B, a driving unit for rotating an optical disk 12, a magnetic head and others irrelevant to the present invention are not shown. An optical disk device 35 includes an optical disk 12 serving as an optical storage medium of magneto-optic recording method, and an optical pickup device 20. Optical pickup device 20 includes an objective lens 11, a collimate lens 10, and an optical miniaturized module 17.

Optical miniaturized module 17 includes a semiconductor laser 18 serving as a source of light for irradiating the optical storage medium. Arranged on the optical path of the laser light emitted from semiconductor laser 18 is a diffraction grating 3 serving as sub beam formation means for forming a main beam and at least one sub beam from the laser light. Diffraction grating 3 in the present embodiment is in a rectangular shape in cross section. In the present embodiment, a main beam M40, a sub beam A41 and a sub beam B42 are formed as the laser light passes through diffraction grating 3.

A polarization diffraction grating 2 is also formed on the above-described optical path, as optical path separation means for separating the emitted laser light and reflected light from optical disk 12. Semiconductor laser 18 is arranged inside a package 16, and diffraction grating 3 is arranged at a glass member 15 such as a quartz substrate. Glass member 15 is arranged on the upper surface of package 16, and another glass member 14 formed of a quartz substrate or the like is arranged on top of glass member 15. Polarization diffraction grating 2 is formed at glass member 14.

A polarization hologram 1 serving as reflected light division means is arranged on the upper surface of glass member 15, to a side to avoid the optical path of the laser light directed to optical disk 12. Polarization hologram 1 is formed on the optical path of the reflected light diffracted by polarization diffraction grating 2. Polarization hologram 1 divides the reflected light from optical disk 12. A photodetector 7 is arranged inside package 16, on the optical path of the laser light divided by polarization hologram 1 to detect the same.

A polarization diffraction grating 2 is arranged on the optical path of the laser light, between diffraction grating 3 and optical disk 12. Polarization diffraction grating 2 has a function of transmitting the laser light from semiconductor laser 18, and a function of guiding the reflected light from optical disk 12 to polarization hologram 1. That is, the laser light emitted from semiconductor laser 18 passes through polarization diffraction grating 2, whereas the reflected light from optical disk 12 is separated by polarization diffraction grating 2 and directed to polarization hologram 1.

Also arranged on the optical path of the laser light emitted from optical miniaturized module 17 are a collimate lens 10 for converting the laser light to parallel beams and an objective lens 11 for focusing the laser light onto optical disk 12.

FIG. 2 is a plan view of polarization hologram 1 according to the present embodiment. Polarization hologram 1 is in the form of a circle in a plane. Polarization hologram 1 includes a first parting line 51 that is defined in the direction (X direction) optically corresponding to the radial direction as the optical disk rotates. First parting line 51 extends from one end to the other end, passing the center of the circle as the planar shape of polarization hologram 1. That is, first parting line 51 is defined such that it has a length the same as the diameter of the circle as the planar shape of polarization hologram 1. Polarization hologram 1 also has a second parting line 52 that is defined in the direction (Y direction) perpendicular to the direction optically corresponding to the radial direction as the optical disk rotates. Second parting line 52 starts from the center of the circle as the planar shape of polarization hologram 1 and extends to reach the perimeter thereof. That is, second parting line 52 is defined such that it has a length the same as the radius of the circle as the planar shape of polarization hologram 1. First and second parting lines 51 and 52 are orthogonal to each other.

As shown in FIG. 2, polarization hologram 1 includes an a area 61 that corresponds to an upper side of first parting line 51, and a b area 62 and a c area 63 that correspond respectively to one and the other of two areas on the lower side of first parting line 51 partitioned by second parting line 52. In these three areas, the diffraction directions and the diffraction angles are different from each other. In the present embodiment, diffraction efficiency is uniform in the three areas, although it may be differentiated from each other.

In FIGS. 1A and 1B, polarization hologram 1 is positioned in the Z direction to let the reflected lights of the sub beams pass therethrough avoiding the first parting line. Such an arrangement would be easier if the position of polarization hologram 1 in the Z direction is closer to photodetector 7.

If the distance between polarization hologram 1 and photodetector 7 is short, however, it is necessary to design polarization hologram 1 to have a greater diffraction angle, which requires formation of polarization hologram 1 with a smaller grating pitch. Manufacture of the diffraction grating, however, is easier with a larger grating pitch, and thus, a smaller diffraction angle is desirable.

Based on the above-described relation, it is preferable that polarization hologram 1 is arranged at a distance from photodetector 7 within a range permitting the reflected lights of the sub beams to pass through polarization hologram 1 avoiding first parting line 51, and at the same time, arranged at a position where the diffraction angle of polarization hologram 1 can be set as small as possible. Those and other factors such as constants of collimate lens 10 and objective lens 11 are designed as appropriate.

In FIG. 2, two sub beams A and B pass through sub beam A incident area 46 and sub beam B incident area 47, respectively, avoiding first parting line 51. Main beam M passes through main beam M incident area 45.

Main beam M incident area 45 is arranged such that the center of the main beam passes the crossing point of first and second parting lines 51 and 52. Sub beam A incident area 46 is arranged such that it is bisected in the X direction by second parting line 52. Main beam M is divided by first and second parting lines 51 and 52, and sub beam A is divided by second parting line 52. Sub beams A and B are preceding and succeeding beams, respectively, of main beam M.

Figure 3:
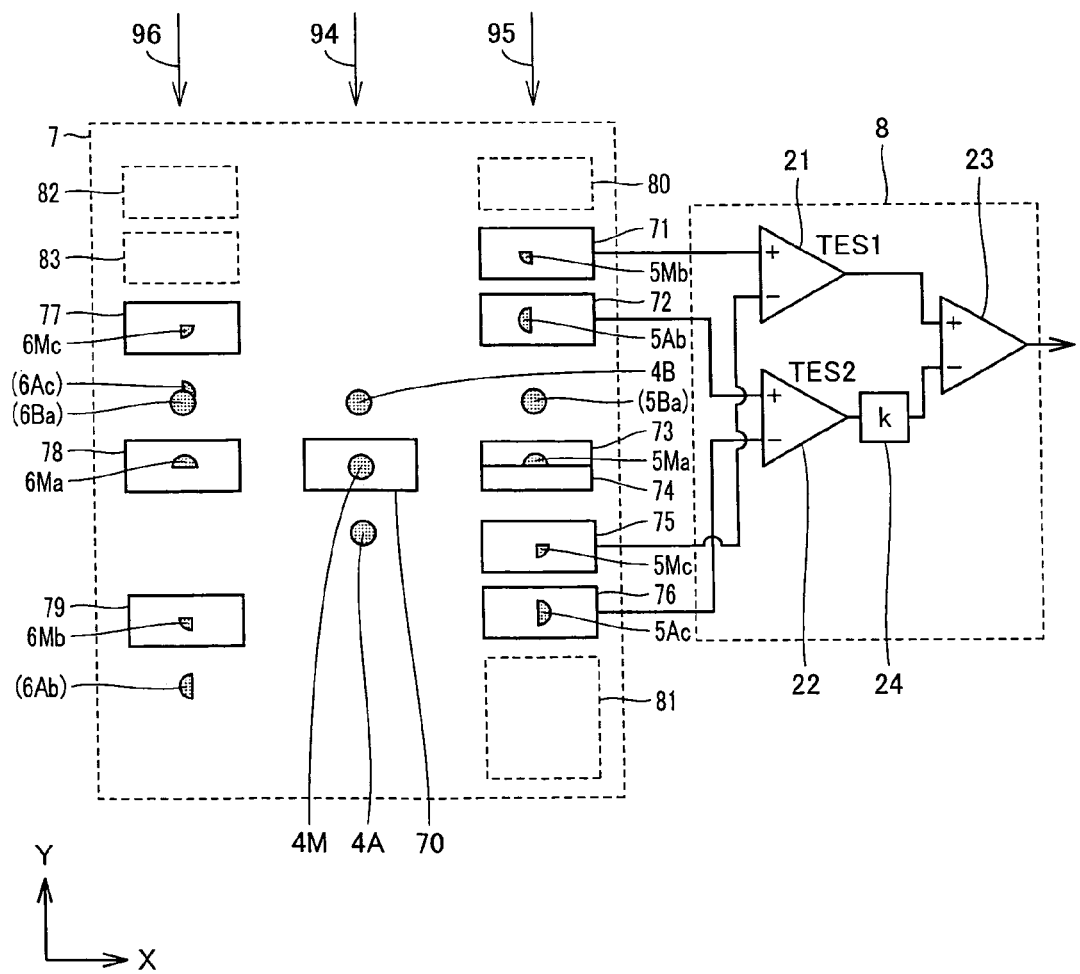
FIG. 3 schematically illustrates a photodetector and an operation unit in the first embodiment.

FIG. 3 schematically shows a photodetector and an operation unit for performing operations on signals obtained from the photodetector, in the optical disk device according to the present embodiment. Photodetector 7 includes a plurality of light receiving portions, formed in three rows. In FIG. 3, the row indicated by an arrow 94 corresponds to the area where the 0th-order diffracted light reaches in the polarization hologram. The +1st-order diffracted light arrives at the row indicated by an arrow 95, and the −1st-order diffracted light arrives at the row indicated by an arrow 96. Photodetector 7 includes light receiving portions 71-76 for receiving light diffracted by polarization hologram 1 in the +1st-order direction, a light receiving portion 70 for receiving light diffracted in the 0th-order direction, and light receiving portions 77-79 for receiving light diffracted in the −1st-order direction. Here, signals output from light receiving portions 71-79 are represented as S71-S79, respectively.

The operation unit 8 is for performing operations on the signals from photodetector 7. Operation unit 8 is configured to generate a first tracking error signal (push-pull signal of the main beam) by performing an operation on the detected signals of two divided lights that are formed when the reflected light of main beam M is divided into b area 62 and c area 63 with the boundaries defined by first and second parting lines 5i and 52. It is also configured to generate a second tracking error signal (push-pull signal of the sub beam) by performing an operation on the detected signals of two divided lights that are formed when the reflected light of the sub beam is divided into two areas with the boundary defined by second parting line 52.

Further, operation unit 8 is configured to generate a third tracking error signal by performing an operation using the first and second tracking error signals. Operation unit 8 has subtracters 21, 22 and 23 for subtraction, and an amplifier 24 for amplifying a signal by k times.

In FIGS. 1A and 1B, the laser light emitted from semiconductor laser 18 is a linear polarized light (P polarization). The laser light is incident on diffraction grating 3 in the form of a linear grating, where it is transmitted and diffracted to form three beams, i.e., main beam M that is the 0th-order diffracted light (transmitted light), sub beam A that is the +1st-order diffracted light, and sub beam B that is the −1st-order diffracted light. In the present embodiment, diffraction grating 3 is a three-beam diffraction grating. This diffraction grating is a linear grating having a rectangular cross section, which is easy to manufacture and is suitable as the sub beam formation means.

FIG. 1B is a cross sectional view illustrating main beam M and two sub beams A, B until the laser light reaches the optical disk. As shown in FIG. 1B, main beam M 40 is formed in the traveling direction of the laser light emitted from semiconductor laser 18, and sub beam A 41 and sub beam B 42 corresponding to the ±1st-order diffracted lights are generated, offset from main beam M 40 in the Y direction, to sandwich main beam M 40 therebetween.

Main beam M 40 and sub beam A 41 and sub beam B 42 are incident on polarization diffraction grating 2. Polarization diffraction grating 2 of the present embodiment is formed to provide the 0th-order diffraction efficiency (transmittance) of 80% and the ±1st-order diffraction efficiencies of 8% each for the P polarization, and the ±1st-order diffraction efficiencies of 40% each for the S polarization. Most of the laser light emitted from semiconductor laser 18 is transmitted by polarization diffraction grating 2, rather than diffracted. The three beams having been transmitted through polarization diffraction grating 2 are incident on collimate lens 10, through which they become parallel lights. Objective lens 11 then focuses the three light beams onto the information recording surface of optical disk 12.

When reflected from optical disk 12, the light experiences the Kerr effect in accordance with a recorded signal, and the reflected light has its polarization direction rotated.

The three beams of reflected light from optical disk 12 pass through objective lens 11 and collimate lens 10 successively, and are incident on polarization diffraction grating 2. In polarization diffraction grating 2, a +1st-order diffracted light 9 occurs which is diffracted in the +X direction in FIG. 1A. The ±1st-order diffraction efficiencies in polarization diffraction grating 2 are set to 8% and 40% for P and S polarization, respectively. Polarization diffraction grating 2 is used as means for multiplying the Kerr rotation angle applied to the reflected light.

The +1st-order diffracted light 9 from polarization diffraction grating 2 is incident on polarization hologram 1, where a 0th-order diffracted light 4, a +1st-order diffracted light 5 and a −1st-order diffracted light 6 are generated corresponding to main beam M and two sub beams A and B, respectively.

In FIG. 2, main beam M of the reflected light reaches main beam M incident area 45 on the main surface of polarization hologram 1. Main beam M has its center passing the crossing point of first and second parting lines 51 and 52. Main beam M is divided according to an a area 61, a b area 62 and a c area 63, with the boundaries defined by first and second parting lines 51 and 52.

Sub beam A reaches sub beam A incident area 46, avoiding first parting line 51, where it is divided according to b area 62 and c area 63. Sub beam A reaches inside the region formed by combining b and c areas 62 and 63. Sub beam B reaches sub beam B incident area 47, avoiding first parting line 51, inside the a area 61.

The transmitted or diffracted light generated via polarization hologram 1 is directed to light receiving portions in photodetector 7 shown in FIG. 3. Generally, each light receiving portion is designed to have laser light focused on its surface, and thus, the beam having reached the light receiving portion creates an approximately spot shape. In FIG. 3, however, for better understanding of where in the polarization hologram the light was divided, the impinging portion of the light is relatively increased in size and shown in a shape corresponding to that of the area where it was divided.

FIG. 3 shows the impinging portions of the laser lights. The reference characters have been allotted thereto in the following manner. The first letter of the reference character indicates whether it is a transmitted light or a diffracted light. Specifically, "5" represents the +1st-order diffracted light, "6" represents the −1st-order diffracted light, and "4" represents the 0th-order diffracted light (transmitted light). The second letter indicates whether the beam is main beam M or sub beam A or B. "M" represents main beam M, and "A" and "B" represent sub beams A and B, respectively. The third letter indicates an area in the polarization hologram where the light was divided. "a" represents the light diffracted in the a area, "b" represents the light diffracted in the b area, and "c" represents the light diffracted in the c area. For example, of the impinging portions of the laser lights, the one denoted by "5Mc" indicates the +1st-order diffracted light of main beam M, having passed through the c region of the polarization hologram. The 0th-order diffracted light is denoted by only the first two letters, such as "4M".

In FIG. 3, the impinging portions of the laser lights indicated by the reference characters in parentheses correspond to those not used for signal detection in the present embodiment, although they may be utilized as detected signals as appropriate.

Detection of a tracking error signal is now explained. The diffracted lights in the b and c regions each include an overlapping portion (contributing to generation of a push-pull signal) of the 0th-order diffracted light and the ±1st-order diffracted lights that are generated when reflected at the tracking of the optical disk. The tracking error signal is formed based on the differential of these detected signals.

In the present embodiment, the push-pull signal of main beam M (first tracking error signal: TES 1) is obtained from the differential of S71 and S75, which correspond to the output signals of diffracted lights 5Mb and 5Mc in b and c regions 62 and 63, respectively, of main beam M, by the following expression (5).

$$TES1 = S71 - S75 \quad (5)$$

As to the impinging portions 5Ab and 5Ac of the diffracted lights of sub beam A, the push-pull signal of sub beam A (second tracking error signal: TES2) is obtained from the differential of output signals S72 and S76, by the following expression (6).

$$TES2 = S72 - S76 \quad (6)$$

Main beam M and sub beam A are irradiated onto the tracking of the optical disk such that the obtained push-pull signals TES1 and TES2 have their phases inverted from each other.

Offset components due to movement of the objective lens during the tracking operation occur in the same polarity in main beam M and sub beam A. Thus, using signal TES2 obtained only from sub beam A as the second tracking error signal, the offset component due to the shift of the objective lens can be cancelled by an operation as expressed by the following expression (7), to form a third tracking error signal TES3 that is enhanced in push-pull amplitude compared to the push-pull signal of TES 1. Application of TES3 can realize stable tracking servo.

$$TES3 = TES1 - kTES2 \quad (7)$$

The constant k in expression (7) is for compensation of the intensity ratio of main beam M and sub beams A, B. In the present embodiment, main beam M and sub beams A and B in the three-beam diffraction grating has the intensity ratio of 10:1:1. Further, main beam M is bisected by the first parting line. Thus, the intensity ratio of the laser light regarding main beam M and sub beam A detected by the photodetector holds the following relation. Main beam M: sub beam A=10×1/2:1×1=5:1. As such, in the present embodiment, constant k in TES3 in expression (7) is set to 5 to cancel the offset due to the movement of the objective lens.

When an optical disk of magneto-optic recording method is used as the optical storage medium, there is no change in reflectance between the recorded portion and the unrecorded portion. Thus, it is unnecessary to detect both the sub beams preceding and succeeding the main beam as in the conventional art. Accordingly, it is possible to detect only one of sub beam A and sub beam B (sub beam A in the present embodiment) and use it as second tracking error signal TES2 obtained from the sub beam.

In the present embodiment, the diffraction grating serving as the sub beam formation means has a rectangular shape in cross section, and thus, sub beams A and B are formed as the 1st-order diffracted lights by the polarization hologram. However, only the 1st-order diffracted light of sub beam A is used as the second tracking error signal. This can reduce the number of light receiving portions to be formed in the photodetector.

Figure 7:
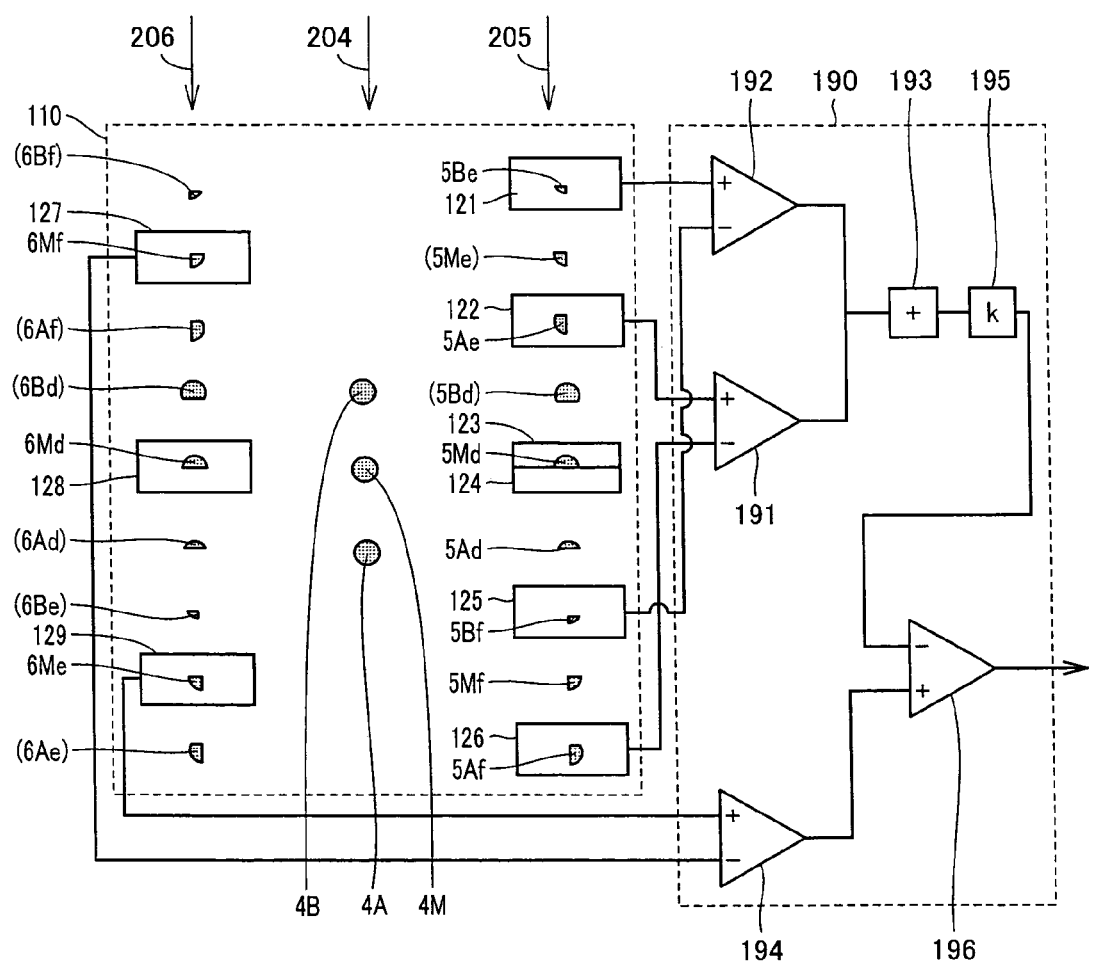
FIG. 7 schematically illustrates a photodetector and an operation unit based on the conventional technique.

Hereinafter, comparison is made between the photodetector of the present invention (see FIG. 3) and the photodetector of the conventional art (see FIG. 7). In the optical miniaturized module of the present embodiment, sub beam A is not diffracted in the a area of the polarization hologram. There is no portion corresponding to the impinging portion 5Ad in the conventional case, so that other light receiving portion(s) can be placed at the region corresponding to impinging portion 5Ad. In the present embodiment, light receiving portion 75 is placed at the relevant portion. As such, in addition to the benefit that the light receiving portions can be reduced in number, they can be arranged closer to the center of the photodetector, enabling reduction in size of the photodetector as a whole.

Further, sub beam B is also configured to avoid the first parting line in the optical miniaturized module of the present embodiment. This means that sub beam B is not diffracted in the c region of the polarization hologram, so that there is no light impinging on the portion 5Bf as in the conventional case, where a light receiving portion, light receiving portion 76 in the present embodiment, can be arranged. As a result, as shown in FIG. 3, the region 81 delimited by a broken line, where the light receiving portion has been arranged in the conventional art, becomes unnecessary.

Furthermore, in the optical miniaturized module of the present embodiment, sub beam B is not detected. Thus, it is unnecessary to provide a light receiving portion in the portion corresponding to the impinging portion 5Be in the conventional art, and the region 80 delimited by a broken line in FIG. 3 becomes unnecessary. Still further, the impinging portion 6Ac of the unused diffracted light of sub beam A can be made to overlap the impinging portion 6Ba, as shown in FIG. 3. As a result, light receiving portion 77 can be arranged in the vicinity of the center of the photodetector, eliminating the need to provide the light receiving portion in region 82 or 83 delimited by broken lines.

As such, by causing the sub beams of the reflected light to reach the areas avoiding the first parting line, the light-impinging portions on the photodetector can be reduced, enabling downsizing of the photodetector.

In FIG. 3, operation unit 8 is schematically shown on the right side of photodetector 7. Operation unit 8 includes circuits for performing operations corresponding to expressions (5) through (7), which are shown in simplified form. Subtracter 21 calculates the above-described TES1. Subtracter 22 calculates TES2. Amplifier 24 multiplies the signal obtained by subtracter 22 by k. Subtracter 23 calculates TES3 described above.

The optical miniaturized module according to the present invention calculates TES2 from two light receiving portions 72, 76. This can reduce the number of calculators in operation unit 8, compared to the optical miniaturized module based on the conventional art. Further, the circuit configuration for generating the tracking error signals is simplified.

In the present embodiment, the three-beam diffraction grating having a rectangular cross section that is easy to manufacture and inexpensive has been used as the sub beam formation means. The present invention however is not specifically limited thereto. For example, a blazed grating having a surface provided with continuous irregularities (like saw teeth) in cross section may be employed. When the blazed grating is used, main beam M and sub beam A of the +1st-order diffracted light can be formed from the light emitted from the semiconductor laser, substantially suppressing generation of sub beam B (−1st-order diffracted light) not used in the operation of the tracking error signals. In this case, it is possible to increase the light intensity of sub beam A without decreasing the light intensity of main beam M, and thus, the output of second tracking error signal TES2 for compensation of the offset due to the shift of the objective lens can be increased. As a result, tracking performance by third tracking error signal TES3 improves, ensuring stable tracking.

In the optical miniaturized module of the present embodiment, polarization hologram 1 serving as the reflected light division means is positioned such that the reflected light of the sub beam reaches the position in the region of polarization hologram 1 avoiding first parting line 51. With this configuration, it is readily possible to cause the reflected light of the sub beam to reach the position avoiding the first parting line. The way of causing the reflected light of the sub beam to reach the position avoiding the first parting line is not specifically limited. For example, the diffraction angle of diffraction grating 3 in FIGS. 1A and 1B may be set to a prescribed angle to let the reflected light of the sub beam reach the position avoiding the first parting line. To this end, the grating pitch of diffraction grating 3 may be set to an adequate pitch.

The optical miniaturized module of the present embodiment is provided with the optical path separation means having functions for transmitting the light from the light source and for guiding the reflected light from the optical storage medium to the reflected light division means. With this configuration, the reflected light division means can be arranged to a side avoiding the optical axis of the light from the light source, so that the degree of freedom in arrangement of the reflected light division means and the photodetector, and hence, the degree of design freedom of the optical miniaturized module improves. Further, the optical path separation means can be added with the function of multiplying the Kerr rotation angle, which improves the detecting function of a magneto-optic signal. Magneto-optic signal MO is obtained by the following expression (8).

$$MO=S70-(S73+S78+S71+S75+S77+S79) \qquad (8)$$

The optical path separation means preferably includes a polarization diffraction grating. With this configuration, the optical path separation means itself can be reduced in thickness, leading to reduction in size and thickness of the optical miniaturized module.

An optical pickup device according to the present invention includes the above-described optical miniaturized module. Further, an optical disk device according to the present invention includes the above optical pickup device. With such configurations, it is possible to provide an optical pickup device and optical disk device that are reduced in size and simplified in circuit configuration of an operation unit. They are applicable e.g. to an MD (mini disk device), an MO (magneto-optic disk device), and others.

Second Embodiment

Figure 4:
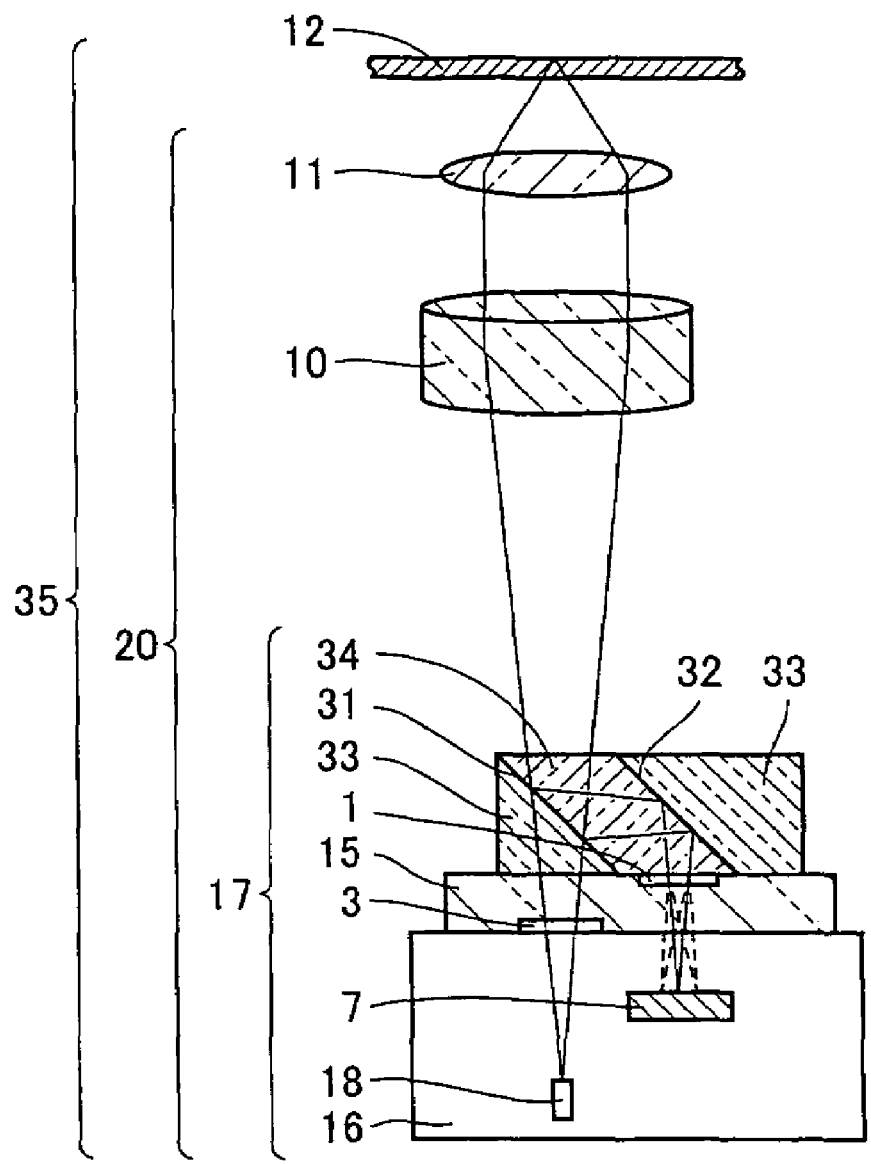
FIG. 4 is a schematic cross sectional view of an optical disk device according to a second embodiment of the present invention.
Figure 5A:
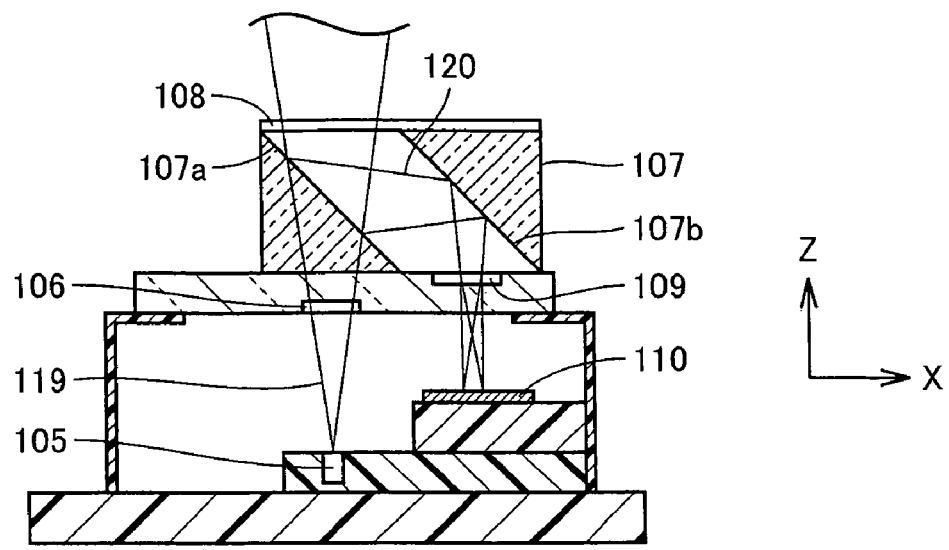
FIGS. 5A and 5B illustrate an optical miniaturized module based on a conventional technique.
Figure 5B:
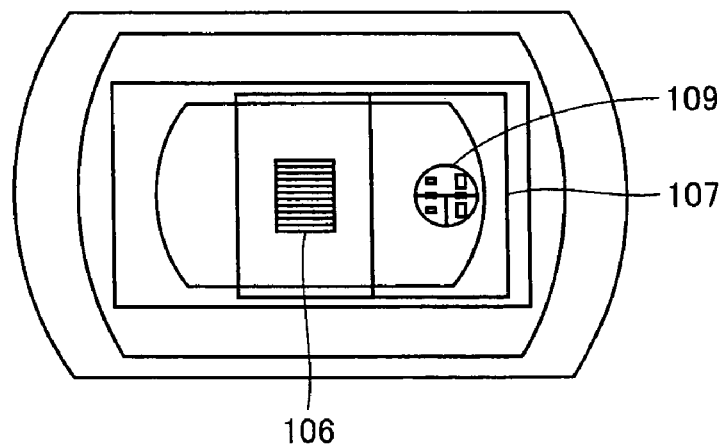

Referring to FIG. 4, an optical miniaturized module, optical pickup device and optical disk device according to a second embodiment of the present invention are described.

FIG. 4 is a cross sectional view of the optical disk device according to the present embodiment, which is similar to the optical miniaturized module of the first embodiment in that it includes semiconductor laser 18 for irradiating optical disk 12 with laser light, and diffraction grating 3 serving as the sub beam formation means for forming main beam M and at least one sub beam from the laser light. Further, as in the optical miniaturized module of the first embodiment, semiconductor laser 18 and photodetector 7 are arranged inside package 16, glass member 15 is formed on top of package 16, and polarization hologram 1 is arranged at the upper portion of glass member 15.

In the present embodiment, the optical path separation means includes a polarization beam splitter 31, which is formed by the boundary surface of a first optical medium 33 and a second optical medium 34. The boundary surface serving as polarization beam splitter 31 is formed, on the optical path of the laser light emitted from semiconductor laser 18 and directed to optical disk 12, with a tilted angle of 45° with respect to the traveling direction of the laser light. Another boundary surface of first optical medium 33 and second optical medium 34 is formed in parallel with the boundary surface constituting polarization beam splitter 31, to form a reflecting surface 32. Reflecting surface 32 is formed avoiding the optical path of the laser light emitted and directed to optical disk 12. Reflecting surface 32 is arranged immediately above polarization hologram 1.

Otherwise, the configuration of the present embodiment is identical to that of the first embodiment, and thus, description thereof is not repeated here.

The optical miniaturized module of the present embodiment and the optical miniaturized module of the first embodiment are similar to each other in that the laser light is emitted from semiconductor laser 18 and at least one sub beam is formed by diffraction grating 3 to irradiate optical disk 12. They are also similar to each other in that the light reflected from optical disk 12 is guided to and divided by polarization hologram 1, and signals are detected by photodetector 7.

The laser light emitted from semiconductor laser 18 passes through diffraction grating 3, where a sub beam is formed, which then passes through polarization beam splitter 31. The reflected light from optical disk 12 enters polarization beam splitter 31, where its direction is changed. In FIG. 4, most of the reflected light has its optical path changed in the +X direction. Further, the reflected light is reflected at reflecting surface 32 and directed to polarization hologram 1. The reflected light is incident orthogonally on the main surface of polarization hologram 1. The reflected light is divided by polarization hologram 1 and detected by photodetector 7.

In the present embodiment, the optical path separation means is formed of a first surface where first and second optical media 33 and 34 come into contact with each other. With this configuration, the optical path separation means can readily be formed with a polarization beam splitter having well-known glass members adhered together. This can reduce the cost of the optical miniaturized module and further improve the productivity.

The optical miniaturized module of the present embodiment includes a second surface where the first and second optical media come into contact with each other, parallel to the first surface constituting the polarization beam splitter. The second surface is arranged on the optical path, between the polarization beam splitter serving as the optical path separation means and the polarization hologram serving as the reflected light division means. With this configuration, it is readily possible to cause the reflected light to enter the polarization hologram at a right angle, which facilitates designing of the device. Further, since the reflected light does not suffer deformation on the surface of the polarization hologram, the dividing process of the reflected light becomes easy. Still further, it is possible to form the polarization hologram to have a horizontal main surface, so that the manufacturing step is simplified, and accuracy in manufacture improves.

The other functions and effects of the present embodiment are similar to those of the optical miniaturized module, optical pickup device and optical disk device according to the first embodiment, and thus, description thereof is not repeated here.

According to the present invention, it is possible to provide an optical miniaturized module, optical pickup device and optical disk device that are reduced in size and simplified in circuit configuration of an operation unit. It is also possible to provide an optical miniaturized module, optical pickup device and optical disk device that ensure stable tracking servo.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical miniaturized module, comprising:
    a light source for irradiating an optical storage medium with light;
    sub beam formation means for forming a main beam and at least one sub beam from said light;
    reflected light division means for dividing reflected light from said optical storage medium; and
    a photodetector for detecting said reflected light;
    said reflected light division means including a first parting line defined in a direction optically corresponding to a radial direction as said optical storage medium rotates, and
    the reflected light of said main beam being divided with a boundary defined by said first parting line, and the reflected light of said sub beam reaching a position avoiding said first parting line.

2. The optical miniaturized module according to claim 1, wherein said reflected light division means and said photodetector are arranged at a distance from each other such that the reflected light of said sub beam reaches the position avoiding said first parting line.

3. The optical miniaturized module according to claim 1, wherein said reflected light division means includes a second parting line defined in a direction perpendicular to the direction optically corresponding to said radial direction, and the reflected light of said main beam and at least a part of the reflected light of said sub beam are each divided with a boundary defined by said second parting line.

4. The optical miniaturized module according to claim 1, wherein said sub beam formation means includes a blazed grating.

5. The optical miniaturized module according to claim 1, comprising optical path separation means arranged between said sub beam formation means and said optical storage medium and having a function to transmit the light from said light source directed to said optical storage medium and a function to guide at least a part of said reflected light toward said reflected light division means.

6. The optical miniaturized module according to claim 5, wherein said optical path separation means includes a polarization diffraction grating.

7. The optical miniaturized module according to claim 5, wherein said optical path separation means is formed with a first surface where a first optical medium and a second optical medium come into contact with each other.

8. The optical miniaturized module according to claim 7, comprising a second surface where said first optical medium and said second optical medium come into contact with each other, said second surface being arranged on a path of said light, between said optical path separation means and said reflected light division means, and parallel to said first surface.

9. An optical pickup device, comprising:
    a light source for irradiating an optical storage medium with light;
    sub beam formation means for forming a main beam and at least one sub beam from said light;
    reflected light division means for dividing reflected light from said optical storage medium;
    a photodetector for detecting said reflected light; and
    an objective lens for focusing light emitted from said light source onto said optical storage medium;
    said reflected light division means including a first parting line defined in a direction optically corresponding to a radial direction as said optical storage medium rotates, and
    the reflected light of said main beam being divided with a boundary defined by said first parting line, and the reflected light of said sub beam reaching a position avoiding said first parting line.

10. The optical pickup device according to claim 9, wherein said reflected light division means includes a second parting line defined in a direction perpendicular to the direction optically corresponding to said radial direction, the optical pickup device comprising:
    means for forming a first tracking error signal by performing an operation on detected signals of two divided lights formed when the reflected light of said main beam is divided with a boundary defined by said second parting line;
    means for forming a second tracking error signal by performing an operation on detected signals of two divided lights formed when the reflected light of said sub beam is divided with a boundary defined by said second parting line; and
    means for forming a third tracking error signal by performing an operation using said first tracking error signal and said second tracking error signal.

11. An optical disk device, comprising:
    a light source for irradiating an optical storage medium with light;
    sub beam formation means for forming a main beam and at least one sub beam from said light;
    reflected light division means for dividing reflected light from said optical storage medium;
    a photodetector for detecting said reflected light;
    an objective lens for focusing light emitted from said light source onto said optical storage medium; and
    the optical storage medium of magneto-optic recording method;
    said reflected light division means including a first parting line defined in a direction optically corresponding to a radial direction as said optical storage medium rotates, and
    the reflected light of said main beam, being divided with a boundary defined by said first parting line, and the reflected light of said sub beam reaching a position avoiding said first parting line.

* * * * *